(12) United States Patent
Baeissa

(10) Patent No.: US 10,668,462 B2
(45) Date of Patent: Jun. 2, 2020

(54) MULTIPHASIC TITANIUM DIOXIDE PHOTOCATALYST FOR THE REDUCTION OF CARBON DIOXIDE

(71) Applicant: King Abdulaziz University, Jeddah (SA)

(72) Inventor: E. S. Baeissa, Jeddah (SA)

(73) Assignee: King Abdulaziz University, Jeddah (SA)

( * ) Notice: Subject to any disclaimer, the term of this patent is extended or adjusted under 35 U.S.C. 154(b) by 413 days.

(21) Appl. No.: 15/428,199

(22) Filed: Feb. 9, 2017

(65) Prior Publication Data
US 2018/0221862 A1   Aug. 9, 2018

(51) Int. Cl.
| | |
|---|---|
| *B01J 37/34* | (2006.01) |
| *B01J 21/06* | (2006.01) |
| *B01J 23/42* | (2006.01) |
| *B01J 35/00* | (2006.01) |
| *B01J 35/10* | (2006.01) |
| *B01J 19/12* | (2006.01) |
| *B01J 37/08* | (2006.01) |

(52) U.S. Cl.
CPC ........... *B01J 37/345* (2013.01); *B01J 19/127* (2013.01); *B01J 21/063* (2013.01); *B01J 23/42* (2013.01); *B01J 35/002* (2013.01); *B01J 35/004* (2013.01); *B01J 35/1014* (2013.01); *B01J 35/1019* (2013.01); *B01J 37/343* (2013.01); *B01J 37/08* (2013.01)

(58) Field of Classification Search
None
See application file for complete search history.

(56) References Cited

U.S. PATENT DOCUMENTS

| | | | |
|---|---|---|---|
| 8,551,909 B2 | 10/2013 | Etacheri et al. | |
| 2004/0084080 A1* | 5/2004 | Sager | H01L 51/4226 136/263 |
| 2012/0118723 A1* | 5/2012 | Mao | B01J 21/063 204/157.52 |
| 2012/0225355 A1* | 9/2012 | Balaya | B01J 21/063 429/224 |

(Continued)

FOREIGN PATENT DOCUMENTS

| | | |
|---|---|---|
| JP | 3136339 B2 | 12/2000 |
| JP | 2005-230645 A | 9/2005 |
| WO | WO 2011/050345 A1 | 4/2011 |

OTHER PUBLICATIONS

Iopez et al, photocatalytic activity in the 2.4 dinitroaniline decomposition over TiO2 sol-gel derived catalysts, journal of sol-gel science and technology, 22, 99-107 (Year: 2001).*

(Continued)

*Primary Examiner* — Stefanie J Cohen
(74) *Attorney, Agent, or Firm* — Oblon, McClelland, Maier & Neustadt, L.L.P.

(57) ABSTRACT

A microemulsion technique of synthesizing a multiphasic titanium dioxide photocatalyst is provided, as well as a method of doping the photocatalyst with platinum. The physical properties of different multiphasic titanium dioxide photocatalysts are described. The multiphasic titanium dioxide photocatalyst is used for the reduction of carbon dioxide into methanol, and a method for reusing the photocatalyst is discussed.

19 Claims, 18 Drawing Sheets

(56) References Cited

U.S. PATENT DOCUMENTS

| | | | |
|---|---|---|---|
| 2014/0048494 A1* | 2/2014 | Simmons, Jr. | C02F 1/72 210/748.12 |
| 2015/0087506 A1* | 3/2015 | Castillo Cervantes | B01J 21/063 502/350 |
| 2015/0090937 A1 | 4/2015 | Idriss et al. | |
| 2016/0274695 A1* | 9/2016 | Ando | H01L 51/5262 |

OTHER PUBLICATIONS

Luo et al, synthesis of mesostructured titania with controlled crystalline framework, chem. mater. 15, 3841-3846 (Year: 2003).*

Kim et al, visible light active platinum ion doped TiO2 photocatalyst, j. phys. chem. b, 109, pp. 24260-24267 (Year: 2005).*

Pinjari, Use of Acoustic Cavitation in Sol-Gel Technique (Year: 2012).*

Shujie Wang, et al., "Synthesis of triphasic, biphasic, and monophasic $TiO_2$ nanocrystals and their photocatalytic degradation mechanisms", Research on Chemical Intermediates, vol. 42, Issue 4, Apr. 2016, pp. 3775-3788 (Abstract only).

Wan-Ting Chen, et al., "Effect of the $TiO_2$ Crystallite Size, $TiO_2$ Polymorph and Test Conditions on the Photo-Oxidation Rate of Aqueous Methylene Blue", Topics in Catalysis, vol. 58, Issue 2, Mar. 2015, pp. 85-102 (Abstract only).

Joseph C. Bear, et al., "Anatase/Rutile bi-phasic titanium dioxide nanoparticles for photocatalytic applications enhanced by Nitrogen doping and Platinum nano-islands", Journal of Colloid and Interface Science, vol. 460, 2015, pp. 29-35.

Gian Luca Chiarello, et al., "Effect of titanium dioxide crystalline structure on the photocatalytic production of hydrogen," Photochemical & Photobiological Sciences, vol. 10, 2011, pp. 355-360.

Li Qiu-Ye, et al., "Photocatalytic Reduction of $CO_2$ to Methane on Pt/$TiO_2$ Nanosheet Porous Film," Advances in Condensed Matter Physics, 2014, Article ID 316589, 6 pages.

Renaud Kiesgen De_Richter, et al., "Fighting global warming by photocatalytic reduction of $CO_2$ using giant photocatalytic reactors", Renewable and Sustainable Energy Reviews, vol. 19, 2013, pp. 82-106.

Muhammad Tahir, et al., "Recycling of carbon dioxide to renewable fuels by photocatalysis: Prospects and challenges", Renewable and Sustainable Energy Reviews, vol. 25, 2013, pp. 560-579.

Xin Li, et al., "Adsorption of $CO_2$ in heterostructure CdS($Bi_2S_3$)$TiO_2$ nanotube photocatalysts and their photocatalytic activities in the reduction of $CO_2$ to methanol under visible light irradiation", Chemical Engineering Journal, vol. 180, 2012, pp. 151-158.

Xiukai Li, et al., "Photocatalytic reduction of $CO_2$ over noble metal-loaded and nitrogen-doped mesoporous $TiO_2$", Applied Catalysis A: General, vol. 429-430, 2012, pp. 31-38.

Zhihuan Zhao, et al., "Optimal design and preparation of titania-supported CoPc using sol-gel for the photo-reduction of $CO_2$", Chemical Engineering Journal, vol. 151, 2009, pp. 134-140.

Andre Luiz Da Silva, et al., "Surface energy effects on the stability of anatase and rutile nanocrystals: A predictive diagram for $Nb_2O_5$-doped-$TiO_2$", Applied Surface Science, vol. 393, 2017, pp. 103-109.

Huyen Thi Thuong Tran, et al., "Photocatalytic Performance of Highly Active Brookite in the Degradation of Hazardous Organic Compounds Compared to Anatase and Rutile", Applied Catalysis B: Environmental, vol. 200, 2017, pp. 647-658.

Fozia Z. Haque, et al., "Evaluating photodegradation properties of anatase and rutile TiO2 nanoparticles for organic compounds", Optik, vol. 128, 2017, pp. 191-200.

Tarek A. Kandiel, et al., "$TiO_2$(B)/anatase heterostructure nanofibers decorated with anatase nanoparticles as efficient photocatalysts for methanol oxidation", Journal of Molecular Catalysis A: Chemical, vol. 425, 2016, pp. 55-60.

R.M. Mohamed, et al., "Green synthesis of aniline by phosphorus-doped titanium dioxide polymorphs", Ceramics International, vol. 40, 2014, pp. 6597-6604.

Chan Wai Soo, et al., "Fe-doped mesoporous anatase-brookite titania in the solar-light-induced photodegradation of Reactive Black 5 dye", Journal of the Taiwan Institute of Chemical Engineers, vol. 68, 2016, pp. 153-161.

Lixin Zhang, et al., "Preparation of the anatase/$TiO_2$(B) $TiO_2$ by self-assembly process and the high photodegradable performance on RhB", Ceramics International, vol. 42, 2016, pp. 12726-12734.

Said M. El-Sheikh, et al., "Tailored synthesis of anatase-brookite heterojunction photocatalysts for degradation of cylindrospermopsin under UV-Vis light", Chemical Engineering Journal, 2016, 9 pages.

Renata Kaplan, et al., Simple synthesis of anatase/rutile/brookite $TiO_2$ nanocomposite with superior mineralization potential for photocatalytic degradation of water pollutants, Applied Catalysis B: Environmental, vol. 181, 2016, pp. 465-474.

Yanfeng Cao, et al., "Highly photocatalytic activity of brookite/rutile $TiO_2$ nanocrystals with semi-embedded structure", Applied Catalysis B: Environmental, vol. 180, 2016, pp. 551-558.

Bridget K. Mutuma, et al., "Sol-gel synthesis of mesoporous anatase-brookite and anatase-brookite-rutile $TiO_2$ nanoparticles and their photocatalytic properties", Journal of Colloid and Interface Science, vol. 442, 2015, pp. 1-7.

Xiaojun Shen, et al., "Tailored preparation of titania with controllable phases of anatase and brookite by an alkalescent hydrothermal route", Catalysis Today, vol. 201, 2013, pp. 151-158.

* cited by examiner

MULTIPHASIC TITANIUM DIOXIDE PHOTOCATALYST FOR THE REDUCTION OF CARBON DIOXIDE

BACKGROUND OF THE INVENTION

Technical Field

The present invention relates to a method of synthesizing a multiphasic titanium dioxide nanocomposite and its use as a photocatalyst.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There is an urgent need to find ways to reduce carbon dioxide levels resulting from the combustion of fossil fuels. See R. K. de Richter, et al., Renew. Sustain. Energy Rev. 19 (2013) 82-106; Tahir, M. and Amin, N. A. S., Renew. Sustain. Energy Rev. 25 (2013) 560-579; and Li, X. et al., Chem. Eng. J. 180 (2012) 151-158, each incorporated herein in its entirety. One of the most significant methods to decease carbon dioxide levels, and convert carbon dioxide to value added chemicals such as CO, $CH_3OH$, $CH_4$, HCOOH, HCH, and hydrocarbons is photocatalytic reduction. See Li, X. K., et al., Appl. Catal. A: Gen. 429 (2012) 31-38 and Zhao, Z. et al., Chem. Eng. J. 151 (2009) 134-140, each incorporated herein in its entirety. Titanium dioxide has various applications. However, as a photocatalyst, it has two major disadvantages: its absorption in the UV region and its fast electron-hole recombination. Titanium dioxide primarily exists in three crystalline phases: anatase, rutile, and brookite. Mixtures of $TiO_2$ polymorphs often show superior photocatalytic activities compared to those of the pure phases, because of the enhanced electron-hole separation. Monophase, diphase, or triphase titanium dioxide have been prepared by many groups. Silva et al. controlled the conversion of the anatase form to the rutile form by $Nb_2O_5$ doping. See da Silva, A. L., et al., Applied Surface Science 393 (2017) 103-109, incorporated herein by reference in its entirety. Tran et al. prepared rutile, anatase, and brookite single phases by controlling the concentration of HCl in a hydrothermal method. See Tran, H. T. T., et al., Applied Catalysis B: Environmental 200 (2017) 647-658, incorporated herein by reference in its entirety. Haque et al. prepared rutile and anatase single phases by a sol-gel method. See Haque, F. Z., et al., Optik 128 (2017) 191-200, incorporated herein by reference in its entirety. Kandiel et al. prepared a mixture of the anatase and brookite phases by a hydrothermal method, and calcined the samples at different temperatures. See Kandiel, T. A., et al., Journal of Molecular Catalysis A: Chemical 425 (2016) 55-60, incorporated herein by reference in its entirety. Mohamed and Kadi prepared ternary titanium dioxide and P-doped ternary titanium dioxide via a hydrothermal method at 200° C. See Mohamed, R. M. and Kadi, M. W., Ceramics International 40 (2014) 6597-6604, incorporated herein by reference in its entirety. Soo et al. prepared Fe/anatase-rutile using a Pluronic surfactant. See Soo, C. W., et al., Journal of the Taiwan Institute of Chemical Engineers 68 (2016) 153-161, incorporated herein by reference in its entirety. Zhang et al. prepared a mixture of the anatase and brookite phases by a hydrothermal method using Pluronic and polyethylene glycol as surfactants. See Zhang, L., et al., Ceramics International 42 (2016) 12726-12734, incorporated herein by reference in its entirety. El-Sheikh et al. prepared a mixture of the anatase and brookite phases by a hydrothermal method at 200° C. See El-Sheikh, S. M., et al., Chemical Engineering Journal, 310 (2017) 428-436, incorporated herein by reference in its entirety. Kaplan et al. prepared ternary titanium dioxide by a hydrothermal method at 200° C. See Kaplan, R., et al., Applied Catalysis B: Environmental 181 (2016) 465-474, incorporated herein by reference in its entirety. Cao et al. prepared a mixture of the brookite and rutile phases by an alkyl halide elimination method. See Cao, Y., et al., Applied Catalysis B: Environmental 180 (2016) 551-558, incorporated herein by reference in its entirety. Wang et al. prepared a mixture of the anatase, rutile, and brookite phases by a hydrothermal method at 180° C. See Wang, S., et al., Res Chem Intermed 42 (2016) 3775-3788, incorporated herein by reference in its entirety. Mutuma et al. prepared a mixture of the anatase and brookite phases by a hydrothermal method using glycerine as a surfactant. See Mutuma, B. K., et al., Journal of Colloid and Interface Science 442 (2015) 1-7, incorporated herein by reference in its entirety. Shen et al. prepared the anatase and brookite phases by a hydrothermal method at 200° C. See Shen, X., et al., Catalysis Today 201 (2013) 151-158, incorporated herein by reference in its entirety. A mixture of the anatase, rutile, and brookite phases was prepared only by Mohamed et al. and Wang et al. by a hydrothermal method. See Mohamed, R. M. and Kadi, M. W., Ceramics International 40 (2014) 6597-6604 and Wang, S., et al., Res Chem Intermed 42 (2016) 3775-3788, each incorporated herein by reference in its entirety. Notably, hydrothermal methods require high temperatures and pressures and are dangerous.

In view of the foregoing, one objective of the present invention is to provide a multiphasic titanium dioxide photocatalyst and methods thereof.

BRIEF SUMMARY OF THE INVENTION

According to a first aspect, the present disclosure relates to a method for producing a multiphasic titanium dioxide photocatalyst comprising anatase, brookite, and rutile phases. The method involves mixing a titanium alkoxide, an alcohol, water, an inorganic acid, and a surfactant to form a mixture. The mixture is sonicated to produce a sonicated mixture. The sonicated mixture is dried to form a powder. The powder is heated at 400° C. or greater to form the multiphasic titanium dioxide photocatalyst.

In one embodiment the mixture comprises the titanium alkoxide at a concentration of 0.5-2 M.

In one embodiment the titanium alkoxide is titanium isopropoxide.

In one embodiment the mixture comprises the alcohol at a concentration of 1-5 M.

In one embodiment the mixture comprises the inorganic acid at a concentration of 0.05-1 mM.

In one embodiment the mixture comprises the surfactant at a concentration of 3.5-5.2 mM.

In one embodiment the surfactant is an alkylamine comprising 6-20 carbon atoms per molecule.

In one embodiment, where the surfactant is an alkylamine comprising 6-20 carbon atoms per molecule, the surfactant is hexadecylamine.

In one embodiment the multiphasic titanium dioxide photocatalyst has a band gap energy of 2.46-2.70 eV and a surface area of 91-105 m²/g.

In one embodiment, the method further involves mixing the multiphasic titanium dioxide photocatalyst with a platinum precursor and an alcohol to form a second mixture, irradiating the second mixture with an ultraviolet radiation to produce an irradiated mixture, and drying the irradiated mixture to form a platinum-doped multiphasic titanium dioxide photocatalyst.

In one embodiment the second mixture comprises the platinum precursor at a concentration of 0.5-5 mM and the multiphasic titanium dioxide photocatalyst at a concentration of 5-50 g/L.

In one embodiment the platinum-doped multiphasic titanium dioxide photocatalyst comprises anatase, brookite, and rutile phases, and has a band gap energy of 2.10-2.45 eV and a surface area of 70-90 m²/g.

In one embodiment the platinum-doped multiphasic titanium dioxide photocatalyst comprises 0.5-3 wt % platinum.

According to a second aspect, the disclosure relates to a method of reducing carbon dioxide into methanol. This involves mixing a multiphasic titanium dioxide photocatalyst with a carbonate solution to form a dispersed photocatalyst mixture. The multiphasic titanium dioxide photocatalyst used here comprises anatase, rutile, and brookite phases, and may have a band gap energy of 2.10-2.70 eV and a surface area of 70-105 m²/g. The dispersed photocatalyst mixture is irradiated with light to produce methanol.

In one embodiment the multiphasic titanium dioxide photocatalyst is doped with 0.5-3 wt % Pt.

In one embodiment the dispersed photocatalyst mixture comprises carbonate and/or bicarbonate at a total concentration of 30-150 mM.

In one embodiment the light has a wavelength of 400-700 nm.

In one embodiment the dispersed photocatalyst mixture comprises the multiphasic titanium dioxide photocatalyst at a concentration of 0.2-5 g/L.

In one embodiment the methanol is produced at a rate of 0.20-1.00 μmol/h per gram of the platinum-doped multiphasic titanium dioxide photocatalyst.

In one embodiment, the method of the second aspect further involves recovering the multiphasic titanium dioxide photocatalyst after the irradiating to obtain a recovered multiphasic titanium dioxide photocatalyst. The recovered multiphasic titanium dioxide photocatalyst is reused and maintains photocatalytic activity for at least 4 reaction cycles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
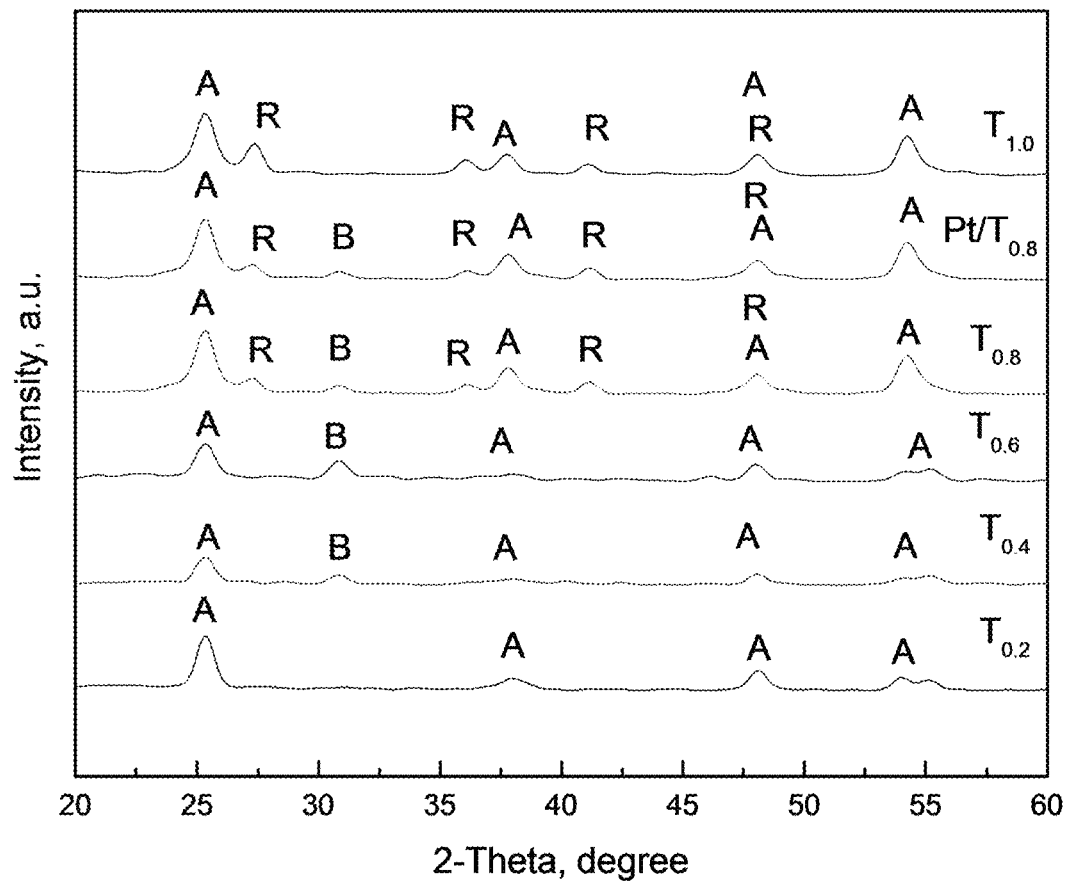
FIG. 1 shows X-ray diffraction (XRD) of $T_{0.2}$, $T_{0.4}$, $T_{0.6}$, $T_{0.5}$, $T_{1.0}$, and $Pt/T_{0.8}$ samples.

Embodiments of the present disclosure will now be described more fully hereinafter with reference to the accompanying drawings, in which some, but not all embodiments of the disclosure are shown.

The present disclosure will be better understood with reference to the following terms and meanings set forth below. Unless defined otherwise, all technical and scientific terms used herein have the same meaning as commonly understood to one of ordinary skill in the art.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, a "composite" is intended to refer to a solid material comprising more than one phase and/or compound.

As used herein, a "nanocomposite" is intended to refer to a composite wherein the phase and/or compound domains have one or more dimensions of 100 nanometers (nm) or less, and/or repeat distances of 100 nm or less.

The term "multiphasic," as used herein, refers to a compound comprising two or more types of amorphous and/or crystalline phases. Biphasic compounds and triphasic compounds may be referred to as multiphasic compounds.

The term "alkyl", as used herein, unless otherwise specified, refers to a saturated straight, branched, or cyclic, primary, secondary, or tertiary hydrocarbon of typically C1 to C8, and specifically includes methyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The term optionally includes substituted alkyl groups. Moieties with which the alkyl group can be substituted are selected from the group consisting of hydroxyl, amino, halogen, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "*Protective Groups in Organic Synthesis*", John Wiley and Sons, Second Edition, 1991, hereby incorporated by reference in its entirety.

The term "alkoxide," as used herein, refers to an alkyl-O— group wherein alkyl is as previously described. Example groups include, but are not limited to, methoxide, ethoxide, propoxide, isopropoxide, butoxide, i-butoxide, and pentoxide.

The present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$.

Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of producing a multiphasic titanium dioxide photocatalyst comprising anatase, brookite, and rutile phases. Here, the method involves mixing a titanium alkoxide, an alcohol, water, an inorganic acid, and a surfactant to form a mixture. The mixture may comprise titanium alkoxide at a concentration of 0.5-2 M, preferably 0.7-1.8 M, more preferably 0.9-1.2 M. The titanium alkoxide may be titanium ethoxide, titanium methoxide, titanium butoxide, titanium propoxide, titanium pentoxide, titanium tetraethoxide, and/or some other titanium alkoxide. In one embodiment, more than one type of titanium alkoxide may be used in the reaction. For instance, a mixture of titanium propoxide and titanium isopropoxide may have a molar ratio of 10:1-1:10, preferably 2:1-1:2, more preferably 1.1:1-1:1.1, and a certain volume may be used to achieve a preferred concentration of titanium as mentioned previously. In a preferred embodiment, the titanium alkoxide is titanium isopropoxide.

The mixture may comprise the alcohol at a concentration of 1-5 M, preferably 1.5-4 M, more preferably 2-3 M of the mixture, and the alcohol may be methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol,3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol, and/or some other alcohol. In a preferred embodiment, the alcohol is ethanol. The alcohol may be a volume that is 10-40%, preferably 15-35%, more preferably 20-30% of the volume of the water in the mixture.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 $\mu S \cdot cm^{-1}$, preferably less than 1 $\mu S \cdot cm^{-1}$, a resistivity greater than 0.1 $M\Omega \cdot cm$, preferably greater than 1 $M\Omega \cdot cm$, more preferably greater than 10 $M\Omega \cdot cm$, a total solid concentration less than 5 mg/kg, preferably less than 1 mg/kg, and a total organic carbon concentration less than 1000 µg/L, preferably less than 200 µg/L, more preferably less than 50 µg/L.

The mixture may comprise the inorganic acid at a concentration of 0.05-1 mM, preferably 0.10-0.70 mM, more preferably 0.15-0.40 mM. The inorganic acid may be a mineral acid such as hydrochloric acid, bromic acid, sulfuric acid, nitric acid, iodic acid, hydrofluoric acid, and/or some other inorganic acid. In one embodiment, the inorganic acid is hydrochloric acid. In an alternative embodiment, an organic acid, such as acetic acid, formic acid, propionic acid, benzoic acid, and/or butyric acid, may be used in place of the inorganic acid. An appropriate amount of the acid may be mixed to result in the mixture having a pH of 2.5-4.5, preferably 3.0-4.0. Alternatively, the mixture may be buffered within a pH range by the addition of a buffering agent, such as citric acid, or by a mixture of acetic acid and sodium acetate. The pH may be adjusted by changing the amounts of buffering agents used or by titrating with a concentrated acid, such as concentrated hydrochloric acid.

The mixture may comprise the surfactant at a concentration of 3.5-5.2 mM, preferably 3.8-4.9 mM, more preferably 4.0-4.6 mM. The surfactant may be cationic in an acidic solution, and may be an alkylamine. In one embodiment, the surfactant is an alkylamine comprising 6-20, preferably 10-18, more preferably 14-17 carbon atoms per molecule. In one embodiment, the surfactant is an alkylamine comprising 16 carbon atoms per molecule and is hexadecylamine. In another embodiment, the surfactant may be an alkyl ammonium salt with a similar range of carbon atoms per molecule. In an alternative embodiment, a non-ionic, a zwitterionic, or an anionic surfactant may be used instead of a cationic surfactant. In an alternative embodiment, a mixture of surfactants may be used, such as a mixture of decylamine and octadecylamine at a molar ratio of 1:5-5:1, preferably 1:2-2:1, more preferably 1:1.1-1.1:1, and at a total concentration as listed previously. Alternatively, a mixture of more than two types of alkylamines may be used as the surfactant, and may have an average of 12-20 carbon atoms per molecule.

In forming the mixture, the titanium alkoxide, the alcohol, the water, the inorganic acid, and the surfactant may be mixed in any order. For example, the alcohol, the water, the inorganic acid, and the surfactant may be mixed to form a homogeneous solution before the titanium alkoxide is mixed. Alternatively, the titanium alkoxide may be mixed with water to form a titanium alkoxide solution, and the alcohol, inorganic acid, and surfactant may be mixed to form a surfactant solution, and then the titanium alkoxide solution may be mixed with the surfactant solution to form the mixture.

The mixture may be sonicated for at least 20 minutes, preferably at least 40 minutes, more preferably at least 60 minutes, using a sonication bath or a sonication probe to produce a sonicated mixture. Alternatively, the mixture may not be sonicated but instead mixed, stirred, rocked, and/or agitated for an equivalent amount of time. In an alternative embodiment, the mixture may only be mixed to form a homogeneous mixture, and then left to sit for the previously mentioned amount of time.

The sonicated mixture may be aged, or left to sit unperturbed, for at least 12 h, preferably at least 24 h, more preferably at least 48 h at 18-37° C., preferably 20-30° C., more preferably 21-27° C. In an alternative embodiment, the sonicated mixture may be mixed, stirred, rocked, and/or agitated for an equivalent time and at an equivalent temperature.

A solid may form in the sonicated mixture, and this solid may be separated from the liquid phase and dried to form a powder. In one embodiment, the previously described steps to form the solid may be performed at pressures and temperatures well below those required by hydrothermal synthesis techniques. For example, the steps of forming the mixture, sonicating the mixture, and aging the sonicated mixture may be performed at atmospheric pressures and at temperatures no greater than 37° C., preferably no greater than 32° C., more preferably no greater than 27° C. In one embodiment, the steps of the steps of forming the mixture, sonicating the mixture, and aging the sonicated mixture are all carried out at room temperature, or 21-27° C. The solid may be isolated by subjecting the sonicated mixture to filtration, distillation, vacuum distillation, evaporation, freeze-drying, spray-drying, and/or some other method. The solid may then be dried for at least 6 hours, preferably at least 12 hours, more preferably at least 24 hours at a temperature of 60-300° C., preferably 70-200° C., more preferably 80-150° C. In one embodiment, the solid may be dried at these temperatures while being subjected to an absolute pressure of 0.001-10 mbar, preferably 0.001-1 mbar, more preferably 0.001-0.5 mbar. In an alternative embodiment, the solid may be dried at one of the previously mentioned pressures but without additional heating.

The powder may be calcined for at least 0.5 h, preferably at least 1 h, more preferably at least 2 h at a temperature of at least 300° C., preferably at least 350° C., more preferably at least 400° C. to form the multiphasic titanium dioxide photocatalyst. In one embodiment, the temperature may be at least 450° C., and in a preferred embodiment, the temperature may be at least 500° C. The multiphasic titanium dioxide photocatalyst may be in the form of nanoparticles, which may be in the same shape or different shapes, and may be the same size or different sizes. The nanoparticles may be spherical, ellipsoidal, oblong, ovoidal, or some other rounded shape. In an alternative embodiment, the nanoparticles may be angular, rectangular, prismoidal, or some other angular shape, or they may be nanorods, nanowires, or nanosprings. The diameter or longest dimension of the nanoparticles may be 2-50 nm, 3-40 nm, 4-30 nm, or preferably 5-20 nm. In one embodiment, the multiphasic titanium dioxide photocatalyst may have a narrow size distribution, comprising nanoparticles with diameters within 75-125% of the average particle diameter, 80-120%, 85-115%, 90-110%, or preferably within 95-105% of the average particle diameter, which may be 5-20 nm. In one embodiment, the multiphasic titanium dioxide photocatalyst may comprise nanoparticles clustered together as agglomerates. As used herein, the term "agglomerates" refers to a clustered particulate composition comprising primary particles, the primary particles being aggregated together in such a way so as to form clusters thereof, with at least 50 volume percent of the clusters having a mean diameter that is at least 2 times the mean diameter of the primary particles, and preferably at least 90 volume percent of the clusters having a mean diameter that is at least 5 times the mean diameter of the primary particles.

In one embodiment, the multiphasic titanium dioxide photocatalyst has a band gap energy of 2.46-2.70 eV, preferably 2.48-2.68 eV, more preferably 2.50-2.60 eV, and a surface area of 91-105 $m^2/g$, preferably 92-102 $m^2/g$, more preferably 93-100 $m^2/g$. The surface may be mesoporous or microporous. The term "microporous" refers to a surface having an average pore diameter of less than 2 nm, while the term "mesoporous" refers to a surface having an average pore diameter of 2-50 nm. The surface area may be determined by measuring gas adsorption on the surface of the particles using BET theory calculations, or by using flow deflection, gravimetric techniques, or other techniques. The band gap energy may be determined by a UV-Vis adsorption spectrum, or by photoluminescence measurements. The band gap energy may also be known as the "electronic" or "electrical" band gap energy.

The multiphasic titanium dioxide photocatalyst may comprise the anatase phase at 0.5-99.5 mol %, or 10-90 mol %, 20-80 mol %, 30-70 mol %, 40-60 mol %, 0.5-10 mol %, 10-20 mol %, 20-30 mol %, 30-40 mol %, 40-50 mol %, 50-60 mol %, 60-70 mol %, 70-80 mol %, 80-90 mol %, or 90-99.5 mol %. The multiphasic titanium dioxide photocatalyst may comprise the rutile phase at 0.5-99.5 mol %, or 10-90 mol %, 20-80 mol %, 30-70 mol %, 40-60 mol %, 0.5-10 mol %, 10-20 mol %, 20-30 mol %, 30-40 mol %, 40-50 mol %, 50-60 mol %, 60-70 mol %, 70-80 mol %, 80-90 mol %, or 90-99.5 mol %. The multiphasic titanium dioxide photocatalyst may comprise the brookite phase at 0.5-99.5 mol %, or 10-90 mol %, 20-80 mol %, 30-70 mol %, 40-60 mol %, 0.5-10 mol %, 10-20 mol %, 20-30 mol %, 30-40 mol %, 40-50 mol %, 50-60 mol %, 60-70 mol %, 70-80 mol %, 80-90 mol %, or 90-99.5 mol %.

In a preferred embodiment, the titanium dioxide photocatalyst is in the form of nanoparticles, and each nanoparticle comprises all three phases (e.g. the anatase, rutile, and brookite phases), but in one embodiment, some nanoparticles may comprise only one or two phases, while other nanoparticles comprise three phases. In an alternative embodiment, the titanium dioxide formed by the method may comprise an amorphous solid. In another alternative embodiment, the multiphasic titanium dioxide photocatalyst may only comprise two phases, and may comprise nanoparticles with only one or two phases. In another alternative embodiment, the titanium dioxide photocatalyst may not be multiphasic, and only comprise one phase. For example, in one alternative embodiment, a titanium dioxide photocatalyst may only comprise the anatase phase.

In one embodiment, the concentration or amount of surfactant in the mixture may lead to different ratios of anatase, rutile, and brookite phases in the multiphasic titanium dioxide photocatalyst. In an alternative embodiment, the concentration or amount of surfactant in the mixture may lead to titanium dioxide photocatalysts comprising one, two, or three phases, and having different band gaps and surface areas. For instance, a titanium dioxide photocatalyst formed using a surfactant concentration of 0.2-1.6 mM, preferably 0.7-1.3 mM, more preferably 1.0-1.2 mM may be monophasic anatase, and may have a surface area of 110-130 $m^2/g$, preferably 115-130 $m^2/g$ and/or a band gap energy of 2.90-4.00 eV, preferably 3.05-3.50 eV. A titanium dioxide photocatalyst formed using a surfactant concentration of 1.7-2.7 mM, preferably 1.9-2.4 mM, more preferably 2.0-2.3 mM, may comprise anatase and brookite phases, and may have a surface area of 10-120 $m^2/g$, preferably 105-115 $m^2/g$ and/or a band gap energy of 2.75-3.20 eV, preferably 2.83-3.05 eV. A titanium dioxide photocatalyst formed using a surfactant concentration of 2.8-3.8 mM, preferably 3.0-3.5 mM, more preferably 3.1-3.4 mM, may comprise anatase and brookite phases, and may have a surface area of 95-110 $m^2/g$, preferably 97-105 $m^2/g$ and/or a band gap energy of 2.55-2.90 eV, preferably 2.65-2.85 eV. A titanium dioxide photocatalyst formed using a surfactant concentration of 3.9-4.9 mM, preferably 4.1-4.6 mM, more preferably 4.2-4.5 mM, may comprise anatase, brookite, and rutile phases, and may have a surface area of 91-105 $m^2/g$, preferably 92-102 $m^2/g$ and/or a band gap energy of 2.46-2.70 eV, preferably 2.48-2.60 eV and may be equivalent to the multiphasic titanium dioxide photocatalyst as described previously. A titanium dioxide photocatalyst formed using a surfactant concentration of 5.0-6.0 mM, preferably 5.1-5.7 mM, more preferably 5.3-5.6 mM, may comprise anatase and rutile, and may have a surface area of 90-110 $m^2/g$, preferably 95-105 $m^2/g$ and/or a band gap energy of 2.50-2.75 eV, preferably 2.50-2.70 eV. In one embodiment, any of the previously mentioned parameters, such as concentrations, times, temperatures, chemical identities, drying methods, mixing methods, mixing orders, and/or some other parameter may have an effect on the ratio and/or number of titanium dioxide phases formed, in addition to physical properties of the titanium dioxide photocatalyst.

In one embodiment, the multiphasic titanium dioxide photocatalyst comprising anatase, rutile, and brookite phases has a lower surface area than the diphasic and monophasic titanium dioxide photocatalysts mentioned above. For example, the multiphasic titanium dioxide photocatalyst comprising anatase, rutile, and brookite phases may have a surface area less than 100 $m^2/g$, preferably less than 97 $m^2/g$. In another embodiment, the multiphasic titanium dioxide photocatalyst comprising anatase, rutile, and brookite phases has a lower band gap energy than the diphasic and monophasic titanium dioxide photocatalysts mentioned above. For example, the multiphasic titanium dioxide photocatalyst comprising anatase, rutile, and brookite phases may have a band gap energy less than 2.64 eV, preferably less than 2.60 eV.

In one embodiment, the disclosure relates to a method of producing a platinum-doped multiphasic titanium dioxide photocatalyst using the multiphasic titanium dioxide photocatalyst produced above. In one embodiment, the multiphasic titanium dioxide photocatalyst may be mixed with a platinum precursor and an alcohol to form a second mixture. The multiphasic titanium dioxide photocatalyst may comprise the mixture at a concentration of 5-50 g/L, preferably 10-40 g/L, more preferably 15-25 g/L. The platinum precursor may comprise the mixture at a concentration of 0.5-5 mM, preferably 1.0-4 mM, more preferably 1.5-3 mM. As defined here, the platinum precursor refers to a salt, complex, and/or metallo-organic compound comprising platinum ion and one or more counter ions. The platinum precursor may or may not comprise additional ligands and may be in any hydration state. The platinum precursor may comprise platinum ions with oxidation states of I, II, III, IV, V, and/or VI. Examples of platinum precursors include, but are not limited to, chloroplatinic acid, platinum(II) chloride, platinum(II) bromide, platinum(II) acetate, platinum(II) acetylacetonate, diammineplatinum(II) nitrite, tetraammineplatinum(II) nitrate, tetraammineplatinum(II) chloride, dimethyl(cycloocta-1,5-diene)platinum(II), cis-dichlorobis(triphenylphosphine)platinum(II), potassium tetrachloroplatinate, Magnus' green salt, Krogmann's salt, dichloro(cycloocta-1,5-diene)platinum(11), potassium trichloro(ethene)platinate(II), platinum(IV) oxide, platinum(IV) hydroxide, platinum(IV) sulfide, ammonium hexachloroplatinate, platinum(IV) bromide, platinum(IV) chloride, platinum(IV) fluoride, potassium hexachloroplatinate, sodium hexachloroplatinate, xenon hexafluoroplatinate, platinum(V) fluoride, dioxygenyl hexafluoroplatinate, and/or platinum(VI) fluoride. In an alternative embodiment, platinum-containing drugs may be used as platinum precursors, such as triplatin tetranitrate, picoplatin, oxaliplatin, nedaplatin, cisplatin, carboplatin, and/or satraplatin. In one embodiment, the platinum precursor may be chloroplatinic acid and, in a further embodiment, the chloroplatinic acid may be in the form of a hexahydrate.

The alcohol may be any of those previously listed. In one embodiment, the alcohol may be methanol, ethanol, n-propanol, isopropanol, and/or n-butanol, and in a preferred embodiment, the alcohol may be ethanol. The alcohol may comprise 95.0-99.5 wt %, preferably 96.0-99 wt %, more preferably 96.5-98.5 wt % of the mixture. In mixing the second mixture, the alcohol, the platinum precursor, and the multiphasic titanium dioxide photocatalyst may be added in any order. For instance, in one embodiment, the multiphasic titanium dioxide photocatalyst may first be dispersed in a volume of the alcohol before mixing with the platinum precursor. In another embodiment, the platinum precursor may first be dissolved in the alcohol before mixing with the multiphasic titanium dioxide photocatalyst. In a preferred embodiment, the alcohol may be divided into two volumes that have a volume ratio of 1:4-4:1, preferably 1:2-2:1, more preferably 1:1.1-1.1:1 or about 1:1, where one volume is mixed with the multiphasic titanium dioxide photocatalyst, and the other volume is mixed with the platinum precursor, and then the two volumes are mixed together to form the second mixture. In an alternative embodiment, the multiphasic titanium dioxide photocatalyst may be synthesized by a different method, for example, by subjecting a titanium alkoxide or a peroxotitanium complex precursor to a hydrothermal method, by using a vapor-liquid-solid growth technique, or by using a sol-gel technique. In an alternative embodiment, a pre-formed multiphasic titanium dioxide photocatalyst may be used. However, in a preferred embodiment, the multiphasic titanium dioxide photocatalyst is not preformed, and is not made by a hydrothermal, a sol-gel, or a vapor-liquid-solid growth technique. In a preferred embodiment, the multiphasic titanium dioxide photocatalyst is formed by a microemulsion method using a surfactant.

In one embodiment, the second mixture may be irradiated with ultraviolet light to produce an irradiated mixture. As defined herein, ultraviolet light refers to electromagnetic radiation comprising one or more wavelengths within the range 1 nm-400 nm. In one embodiment, the second mixture may additionally be irradiated with light from the visible and/or infrared spectra, for example, light having at least one wavelength in the range of 400 nm-1 mm. Alternatively, an irradiation source may be fitted with a filter to block or attenuate light above 400 nm. The irradiation source may be a flame, a lantern, a gas discharge lamp, an incandescent bulb, a laser, a fluorescent lamp, an electric arc, a light emitting diode (LED), a cathode ray tube, sunlight, and/or some other source of light. Preferably the irradiation source may be a gas discharge lamp comprising xenon and/or mercury vapor. Preferably the irradiation source may have a total power output of 50-1000 W, preferably 100-750 W, more preferably 250-600 W, and may be positioned 5-30 cm, preferably 7-20 cm, more preferably 8-15 cm from the closest surface of the second mixture. The second mixture may be irradiated with UV light for at least 6 hours, preferably at least 12 hours, more preferably at least 24 hours. Preferably the second mixture may be stirred or agitated while being irradiated in order to maintain the dispersion of the photocatalyst. However, in one embodiment, the second mixture is not stirred or agitated while being irradiated. During irradiation the second mixture may be enclosed in a container and cooled in order to prevent overheating and/or solvent evaporation. Preferably the irradiation of the UV light causes the reduction and deposition of platinum onto the surface and/or within a portion of an outer layer of the multiphasic titanium dioxide photocatalyst, forming a platinum-doped multiphasic titanium dioxide photocatalyst.

The irradiated mixture may be filtered, washed, and/or dried to isolate the platinum-doped multiphasic titanium dioxide photocatalyst. In one embodiment, the platinum-doped multiphasic titanium dioxide photocatalyst may be dried under a flow of nitrogen gas for at least 3 hours, preferably at least 5 hours, more preferably at least 6 hours and at a temperature of 50-150° C., preferably 80-120° C., more preferably 90-110° C. In another embodiment, the platinum-doped multiphasic titanium dioxide photocatalyst may be dried for the previously mentioned times and temperatures but in a vacuum chamber with an absolute pressure of 0.001-10 mbar, preferably 0.001-1 mbar, more preferably 0.001-0.5 mbar. In an alternative embodiment, the platinum-doped multiphasic titanium dioxide photocatalyst may be dried at room temperature in a vacuum chamber at the previously mentioned pressures, or in an oven open to atmospheric pressure and at a temperature of 50-150° C., preferably 80-120° C., more preferably 90-110° C.

In one embodiment, the platinum-doped multiphasic titanium dioxide photocatalyst comprises 0.5-3.0 wt %, preferably 1.0-2.8 wt %, more preferably 1.5-2.5 wt % Pt. Preferably the platinum is in the form of metallic platinum. In one embodiment, the platinum-doped multiphasic titanium dioxide photocatalyst has a band gap energy of 2.10-2.45 eV, preferably 2.20-2.43 eV, more preferably 2.32-2.41 eV, and a surface area of 70-90 $m^2/g$, preferably 75-90 $m^2/g$, more preferably 80-90 $m^2/g$. Preferably the platinum-doped multiphasic titanium dioxide photocatalyst comprises anatase, rutile, and brookite phases of titanium dioxide as mentioned previously. In one embodiment, the platinum-doped multiphasic titanium dioxide photocatalyst comprises anatase, rutile, and brookite phases and has a lower surface area and a lower band gap energy than a multiphasic titanium dioxide photocatalyst comprising the same phases but without platinum. The platinum-doped multiphasic titanium dioxide photocatalyst comprising anatase, rutile, and brookite phases may also have a lower surface area and a lower band gap energy than monophasic or diphasic titanium dioxide photocatalysts, which were described previously. For example, a platinum-doped multiphasic titanium dioxide photocatalyst comprising anatase, rutile, and brookite phases may have a surface area below 95 $m^2/g$, preferably below 91 $m^2/g$, and a band gap energy less than 2.55 eV, preferably less than 2.46 eV. The platinum may be deposited on the surface of the photocatalyst, doped into an exterior layer of the titanium dioxide, or both. In one embodiment the platinum doping does not change the existing phases or distribution of the phases. The platinum-doped multiphasic titanium dioxide photocatalyst may be in the form and size of nanoparticles and agglomerates as listed previously. In an alternative embodiment, the multiphasic titanium dioxide photocatalyst may be doped with other metals, such as palladium, or other compounds, such as arginine. In another alternative embodiment, a monophasic or diphasic titanium dioxide photocatalyst may be mixed with the second mixture instead of a multiphasic titanium dioxide photocatalyst comprising three phases, and result in a monophasic or diphasic platinum-doped titanium dioxide photocatalyst. For example, a monophasic platinum-doped titanium dioxide photocatalyst may comprise anatase.

According to a second aspect, the present disclosure relates to method of reducing carbon dioxide into methanol. This involves mixing a multiphasic titanium dioxide photocatalyst with a carbonate solution to form a dispersed photocatalyst mixture. In one embodiment, light irradiation generates excited electrons and holes on the $TiO_2$ and/or Pt surface. $H_2O$ and/or $CO_2$ may directly contact or adsorb to the $TiO_2$ and/or Pt surface and form hydrogen atoms (.H) and/or carbon dioxide radicals (.$CO_2$). These species may react with $CO_2$ in the solution to form methanol. In another embodiment, methanol may be formed directly on the surface of the $TiO_2$ or Pt, and then released into the solution. In another embodiment, methane may be formed as an intermediate. The multiphasic titanium dioxide photocatalyst may have properties such as composition, band gap energy, and surface area, as previously described. Preferably, the multiphasic titanium dioxide photocatalyst used here comprises anatase, rutile, and brookite phases, and may have a band gap energy of 2.10-2.70 eV, preferably 2.25-2.70 eV, more preferably 2.30-2.60 eV, and a surface area of 70-105 $m^2/g$, preferably 75-102 $m^2/g$, more preferably 80-100 $m^2/g$. In one embodiment, the multiphasic titanium dioxide photocatalyst is not doped with an additional metal. In another embodiment, the multiphasic titanium dioxide photocatalyst is doped with platinum to form a platinum-doped multiphasic titanium dioxide photocatalyst as described previously and may comprise 0.5-3.0 wt %, preferably 1.0-2.8 wt %, more preferably 1.5-2.5 wt % Pt. In one embodiment, the multiphasic titanium dioxide photocatalyst may be preformed, or synthesized by a method different than the method of the first aspect described previously. A multiphasic titanium dioxide photocatalyst may be doped with platinum by the above method or by a different method such as sputtering or a deposition-precipitation technique. In another embodiment, the platinum-doped multiphasic titanium dioxide photocatalyst is not preformed, and is synthesized from a titanium alkoxide as described earlier. In another embodiment, the multiphasic titanium dioxide photocatalyst may be doped with a different metal, such as palladium, or a mixture of two or more metals.

The carbonate solution may comprise carbonate and/or bicarbonate dissolved in water at a total concentration of 30-150 mM, preferably 50-120 mM, more preferably 65-95 mM. The carbonate solution may be formed by mixing an appropriate amount of carbonate and/or bicarbonate salt with water. Examples of carbonate and bicarbonate salts include sodium bicarbonate, sodium carbonate, sodium sesquicarbonate, potassium bicarbonate, potassium carbonate, ammonium bicarbonate, ammonium carbonate, lithium carbonate, and/or some other salt. Preferably the carbonate solution is made from sodium carbonate and/or sodium bicarbonate. The water may be any type of water as described previously; preferably the water is bidistilled, deionized, deinonized distilled, or reverse osmosis water. In an alternative embodiment, other sources of carbon may be used at different concentrations, for example, carbon dioxide gas may be bubbled in water to form a solution of dissolved carbon dioxide gas and/or carbonic acid. In another alternative embodiment, the carbon dioxide gas and water may be pressurized above atmospheric pressure in order to increase the gas solubility. The platinum-doped multiphasic titanium dioxide photocatalyst may be in the carbonate solution at a concentration of 0.2-5 g/L, preferably 1.0-2.5 g/L, more preferably 1.2-2.0 g/L. In one embodiment, an inert gas, such as nitrogen or argon, may be bubbled in the dispersed photocatalyst mixture in a sealed container for at least 30 minutes, preferably at least 45 minutes, more preferably at least 60 minutes to displace dissolved oxygen gas, and this step may be done before or after mixing the carbonate and/or bicarbonate salt. In another alternative embodiment, a titanium dioxide photocatalyst may be used in the dispersed photocatalyst mixture with or without platinum doping, and with one or more titanium dioxide phases. In another related alternative embodiment, a titanium dioxide photocatalyst having a band gap energy and/or surface area outside the ranges listed above may be used in the dispersed photocatalyst mixture. For example, a titanium dioxide photocatalyst may have a band gap energy lower than 2.20 eV or higher than 2.70 eV and/or a surface area less than 70 m$^2$/g or greater than 105 m$^2$/g.

The dispersed photocatalyst mixture may be irradiated with visible light for 0.5-6 hours, preferably 0.6-4 hours, more preferably 1.0-3 hours. Here, the visible light may comprise one or more wavelengths within the range of 400-700 nm. Preferably an irradiation source is used which emits a broad wavelength range of light and which comprises a portion or the entire visible light spectrum. An irradiation source may additionally emit light of wavelengths below 400 nm and/or above 700 nm. In one embodiment, a filter may be used to prevent UV light from entering the solution, for example, a filter that blocks light with wavelengths less than 420 nm may be used with a xenon or mercury gas discharge lamp. In another embodiment, a solution of 2 M NaNO$_3$ may be placed between the dispersed photocatalyst mixture and the irradiation source to attenuate or block light with wavelengths below 400 nm while letting visible light pass through. Alternatively, an irradiation source may be used which only emits light within the visible spectrum. The irradiation source may emit a total of 50-1000 W, preferably 100-750 W, more preferably 250-600 W, and may be positioned 5-30 cm, preferably 7-20 cm, more preferably 8-15 cm from the closest surface of the dispersed photocatalyst mixture. Where an irradiation source emits heat, the dispersed photocatalyst mixture may be temperature-regulated to prevent overheating and/or evaporation, for example, by water tubing, a water and/or ice bath, ice packs, or air cooling. In a preferred embodiment, the dispersed photocatalyst mixture is maintained at 22-37° C., preferably 25-35° C., more preferably 28-32° C. To limit or prevent evaporation, the dispersed photocatalyst mixture may be in a sealed vessel or some other container, preferably with a transparent window. For example, the window may comprise glass or quartz, though in one embodiment, a polymeric material transparent to visible light and chemically stable with the dispersed photocatalyst mixture may be used. As defined herein, "transparent" refers to an optical quality of a compound wherein a certain wavelength or range of wavelengths of light may traverse through a portion of the compound with a small loss of light intensity. Here, the "transparent window" may causes a loss of less than 10%, preferably less than 5%, more preferably less than 2% of the intensity of a certain wavelength or range of wavelengths of light. In one embodiment, the vessel wall and window may comprise the same material, for example, a vessel may comprise quartz walls, which may also function as transparent windows. The dispersed photocatalyst mixture may be sonicated, stirred, or agitated while being irradiated, though in one embodiment, the dispersed photocatalyst mixture is left to sit while irradiating. In an alternative embodiment, the dispersed photocatalyst mixture may be irradiated with UV light, with or without visible light. In another alternative embodiment, the dispersed photocatalyst mixture may be subjected to high temperatures, high pressures, and/or an electric current in order to catalyze the conversion of carbon dioxide into methanol.

The irradiation of the dispersed photocatalyst mixture may catalyze the conversion of carbon dioxide to methanol, and this conversion may be at a rate of 0.20-1.00 μmol methanol per gram photocatalyst per hour (μmol·g$^{-1}$ h$^{-1}$), preferably 0.40-0.90 μmol·g$^{-1}$·h$^{-1}$, more preferably 0.50-0.85 μmol·g$^{-1}$·h$^{-1}$. The amount of methanol produced may be quantified by gas chromatography.

In one embodiment, following irradiation, the multiphasic titanium dioxide photocatalyst may be separated from the dispersed photocatalyst mixture by filtering and/or centrifugation. The recovered multiphasic titanium dioxide photocatalyst may be recycled and used as a photocatalyst in a second dispersed photocatalyst mixture. The recovered multiphasic titanium dioxide photocatalyst may photocatalyze carbon dioxide into methanol for at least 4, preferably at least 8, more preferably at least 12 additional reaction cycles, and may or may not be washed and/or dried between reaction cycles. Preferably in recycling and reusing the recovered platinum-doped multiphasic titanium dioxide photocatalyst, the photocatalytic activity of producing methanol (as measured in μmol·g$^{-1}$·h$^-$, as described previously) remains within at least 90%, preferably at least 95%, more preferably at least 96% of its original value. In a related alternative embodiment, the multiphasic titanium dioxide photocatalyst may be confined within a flow cell to continuously deliver carbonate solution, irradiate the solution in the presence of the photocatalyst, and remove irradiated solution containing methanol. In this alternative embodiment, the photocatalyst may be fixed to a solid, stationary support within the flow cell. In another alternative embodiment, the multiphasic titanium dioxide photocatalyst may be used to convert carbon dioxide into compounds other than methanol, such as methane and/or formic acid. In another alternative embodiment, the multiphasic titanium dioxide photocatalyst may catalyze the conversion of gas phase carbon dioxide, or may catalyze the reduction of an aqueous metal ion, such as Cr(VI) or Ni(II).

The examples below are intended to further illustrate protocols for preparing, characterizing, and using a multiphasic titanium dioxide photocatalyst, and are not intended to limit the scope of the claims.

Example 1

Preparation of Ternary TiO$_2$ Photocatalysts

Titanium dioxide was prepared via an ultrasonic method as follows: different amounts of hexadecylamine (0.2, 0.4, 0.6, 0.8, and 1 mmol) were dissolved in a mixture of 100 mL bidistilled water, 25 mL ethanol, and 1 mL 0.05 M HCl at room temperature under vigorous stirring for 60 min. Then, 0.2 mol of titanium tetraisopropoxide (TTIP, Aldrich) was added to the mixture under vigorous stirring. The resulting mixtures were ultrasonicated for 60 min. After aging the produced samples for 2 days at room temperature, the obtained materials were dried at 100° C. for 24 h. Finally, the obtained materials were calcined at 500° C. for 2 h. The obtained samples were named according to the amount of added hexadecylamine, where $T_{0.2}$, $T_{0.4}$, $T_{0.6}$, $T_{0.8}$, and $T_{1.0}$ were synthesized from 0.2, 0.4, 0.6, 0.8, and 1.0 mmol of hexadecylamine, respectively.

Preparation of 2 Wt % Pt/TiO$_2$ Nanocomposite 25 mL of ethanol was used to disperse 1 g of the $T_{0.8}$ sample. Another 25 mL of ethanol was used to dissolve 0.053 g of H$_2$PtCl$_6$*6H$_2$O. The resulting mixture was irradiated with a UV lamp for 24 h. The obtained materials were filtered, washed many times, and dried under a flow of nitrogen gas at 100° C. for 6 h. The resulting sample was named Pt/T$_{0.8}$.

Example 2

Characterization

Physical Characterization

The nanostructure morphology and sample dimensions were measured by transmission electron microscopy (TEM; JEOL-JEM-1230). The samples were suspended in ethanol and were ultrasonicated for 30 min. A small amount of the sample was then dried on a carbon-coated copper grid, which was loaded into the TEM. $N_2$-adsorption measurements of the treated samples (2 h under vacuum at 100° C.) were obtained with a Nova 2000 series Chromatech apparatus at 77 K to calculate the surface area. The crystalline phase was determined using powder X-ray diffraction (XRD) with a Bruker axis D8 with Cu K radiation ($\lambda$=1.540 Å) at room temperature. X-ray photoelectron spectroscopy (XPS) measurements were performed on a Thermo Scientific K-ALPHA spectrometer. The band gap energy was determined using ultraviolet-visible diffuse reflectance spectra (UV-Vis-DRS), which were measured using a UV-Vis-NIR spectrophotometer (V-570, Jasco, Japan) in air at room temperature over the wavelengths 200-800 nm. Photoluminescence emission spectra (PL) were obtained using a Shimadzu RF-5301 fluorescence spectrophotometer. Raman spectra were collected at room temperature on a JASCO RFT-6000 spectrometer.

Photocatalytic Tests

The photocatalytic performance of each $T_{0.2}$, $T_{0.4}$, $T_{0.6}$, $T_{0.8}$, Pt/$T_{0.8}$, and $T_{1.0}$ in the reduction of $CO_2$ under visible light was evaluated. First, the required dose of the photocatalyst was dispersed in 50 mL of 0.08 M sodium bicarbonate solution. The dimensions of the reactor were 30 cm×15 cm×5 cm. To remove oxygen, nitrogen gas was passed through the reaction mixture for 1 h. To obtain adsorption-desorption equilibrium, the reaction mixture was kept in the dark for 30 min. A 500 W high-pressure Xe lamp was used as the radiation source and a 2 M $NaNO_2$ solution was used to cut off absorption below 400 nm The photocatalyst solution was irradiated for one hour. The obtained methanol was analyzed using GC-FID. The yield of evolved methanol was calculated by dividing the total amount of evolved methanol by the reaction time. No methanol was detected when the reaction was carried out in the dark or by irradiating the solution without the photocatalyst.

Example 3

Results & Discussion

Characterization of Photocatalysts

FIG. 1 shows the XRD patterns of $T_{0.2}$, $T_{0.4}$, $T_{0.6}$, $T_{0.8}$, $T_{1.0}$, and Pt/$T_{0.5}$. Pure anatase was obtained using 0.2 mmol of hexadecylamine ($T_{0.2}$). A mixture of the anatase and brookite phases was obtained using 0.4 and 0.6 mmol of hexadecylamine ($T_{0.4}$ and $T_{0.6}$). A mixture of the anatase, brookite, and rutile phases was obtained using 0.8 mmol of hexadecylamine ($T_{0.8}$). A mixture of the anatase and rutile phases was obtained using 1.0 mmol of hexadecylamine ($T_{1.0}$ sample). The addition of platinum decreased the crystallinity of the anatase-rutile-brookite nanocomposite as determined by the XRD patterns, suggesting that the addition of platinum is a doping process and not a decoration process.

Figure 2:
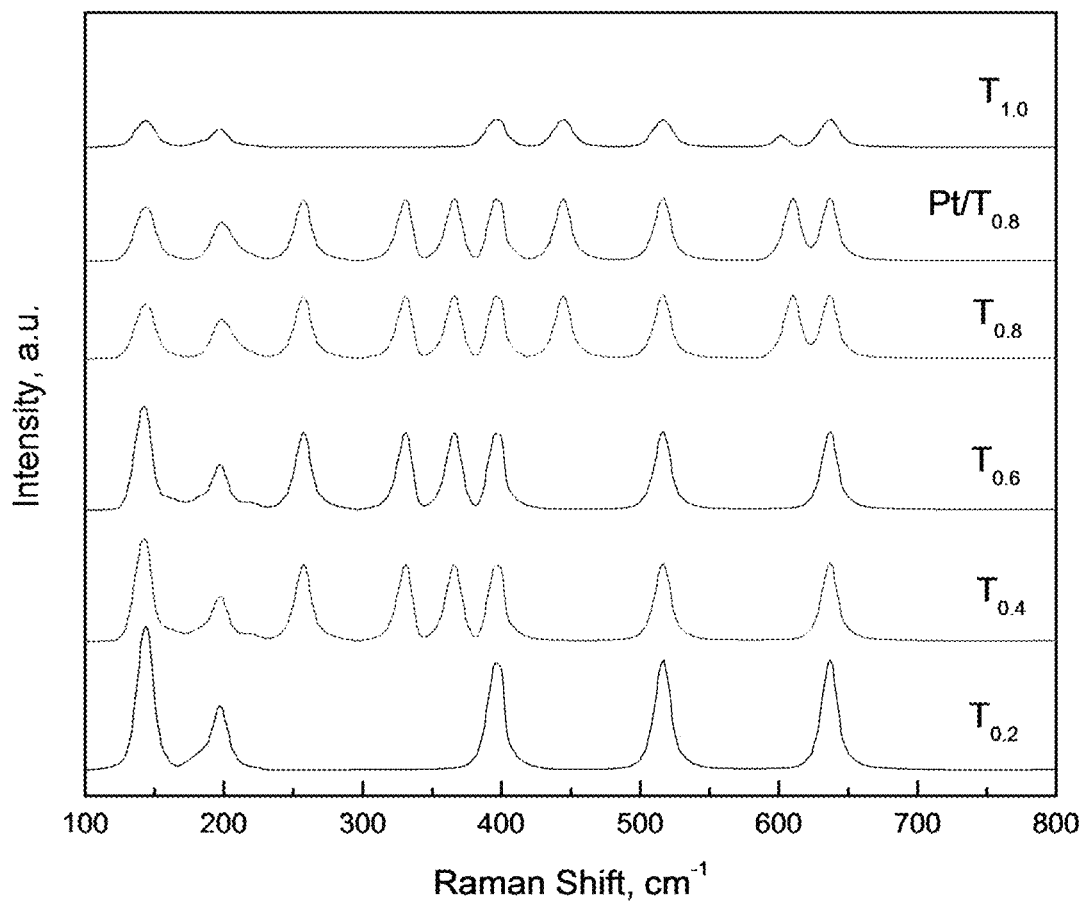
FIG. 2 shows Raman spectra of $T_{0.2}$, $T_{0.4}$, $T_{0.6}$, $T_{0.8}$, $T_{1.0}$, and $Pt/T_{0.8}$ samples.

FIG. 2 shows the Raman spectra of $T_{0.2}$, $T_{0.4}$, $T_{0.6}$, $T_{0.8}$, $T_{1.0}$, and Pt/$T_{0.8}$. $T_{0.2}$ was comprised of the anatase phase only, as noted by the peaks at 146, 199, 400, 518, and 639 cm$^{-1}$, which corresponded to the $E_g(v_6)$, $E_g(v_5)$, $B_{1g}(v_4)$, $A_{1g}(v_3)$-$B_{1g}(v_2)$, and $E_g(v_1)$ modes of the anatase phase, respectively. $T_{0.4}$ and $T_{0.6}$ were comprised of a mixture of the anatase and brookite phases, as noted by the peaks at 248, 322, and 366 cm$^{-1}$, which corresponded to the $A_{1g}$, $B_{1g}$, and $B_{2g}$ modes of the brookite phase, respectively, as well as the peaks at 146, 199, 400, 518, and 639 cm$^{-1}$, which corresponded to the $E_g(v_6)$, $E_g(v_5)$, $B_{1g}(v_4)$, $A_{1g}(v_3)$-$B_{1g}(v_2)$, and $E_g(v_1)$ modes of the anatase phase, respectively. $T_{0.8}$ and Pt/$T_{0.8}$ were comprised of a mixture of the anatase, rutile, and brookite phases, as confirmed by the peaks at 248, 322, and 366 cm$^{-1}$, which corresponded to the $A_{1g}$, $B_{1g}$, and $B_{2g}$ modes of the brookite phase, respectively, as well as the peaks at 146, 199, 400, 518, and 639 cm$^{-1}$, which corresponded to the $E_g(v_6)$, $E_g(v_5)$, $B_{1g}(v_4)$, $A_{1g}(v_3)$-$B_{1g}(v_2)$, and $E_g(v_1)$ modes of the anatase phase, respectively, and the peaks at 446 and 612 cm$^{-1}$, which corresponded to the $E_g$ and $A_{1g}$ modes of the rutile phase, respectively. $T_{1.0}$ was comprised of a mixture of the anatase and rutile phases, as confirmed by the peaks at 446 and 612 cm$^{-1}$, which corresponded to the $E_g$ and $A_{1g}$ modes of the rutile phase, respectively, as well as the peaks at 146, 199, 400, 518, and 639 cm$^{-1}$, which corresponded to the $E_g(v_6)$, $E_g(v_5)$, $B_{1g}(v_4)$, $A_{1g}(v_3)$-$B_{1g}(v_2)$, and $E_g(v_1)$ modes of the anatase phase, respectively. See Mohamed, R. M. and Kadi, M. W., *Ceramics International* 40 (2014) 6597-6604, incorporated herein by reference in its entirety.

Figure 3A:
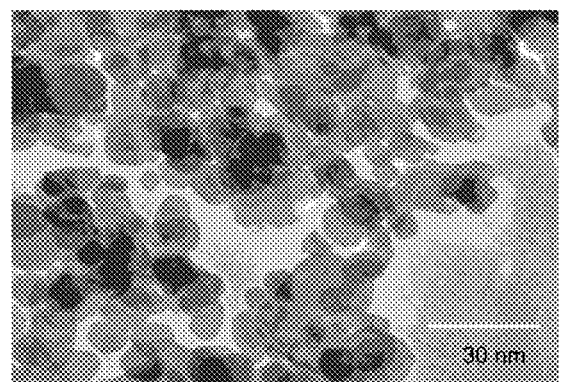
FIG. 3A shows a transmission electron microscopy (TEM) image of the $T_{0.2}$ sample.
Figure 3B:
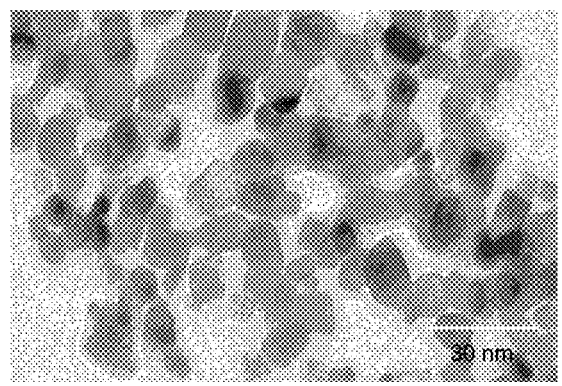
FIG. 3B shows a TEM image of the $T_{0.4}$ sample.
Figure 3C:
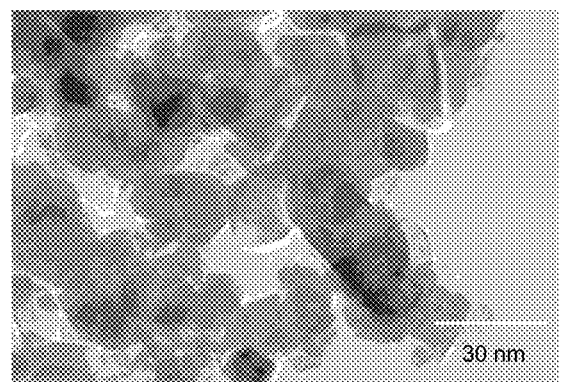
FIG. 3C shows a TEM image of the $T_{0.6}$ sample.
Figure 3D:
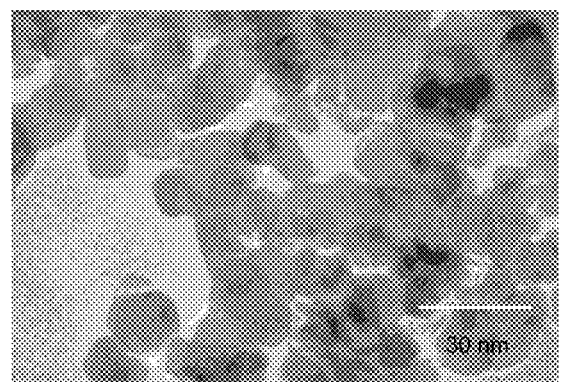
FIG. 3D shows a TEM image of the $T_{0.8}$ sample.
Figure 3E:
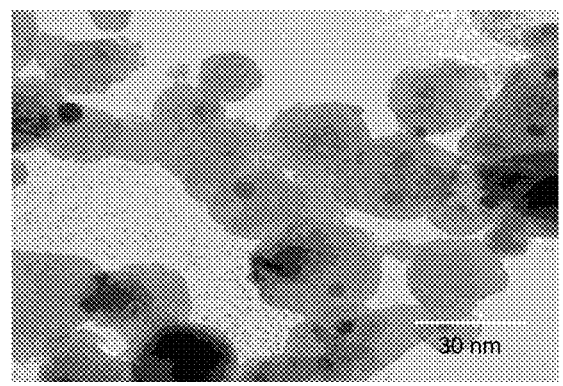
FIG. 3E shows a TEM image of the $T_{1.0}$ sample.
Figure 3F:
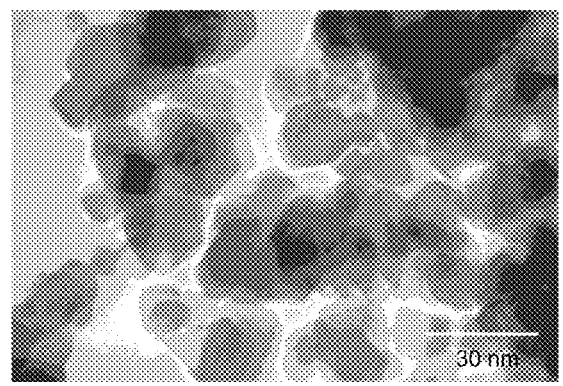
FIG. 3F shows a TEM image of the $Pt/T_{0.8}$ sample.
Figure 4A:
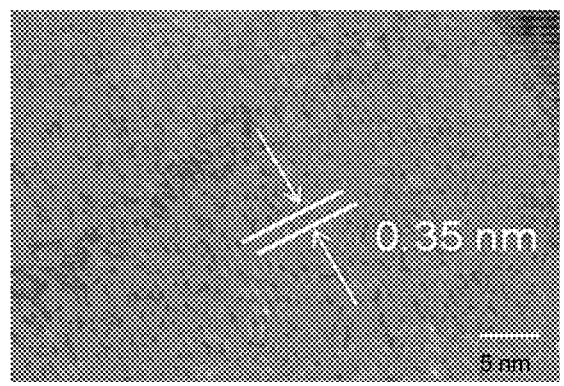
FIG. 4A shows a high resolution TEM (HRTEM) image of the $T_{0.2}$ sample.
Figure 4B:
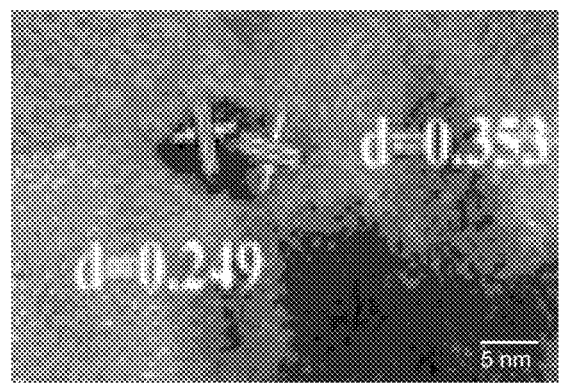
FIG. 4B shows a HRTEM image of the $T_{0.6}$ sample.
Figure 4C:
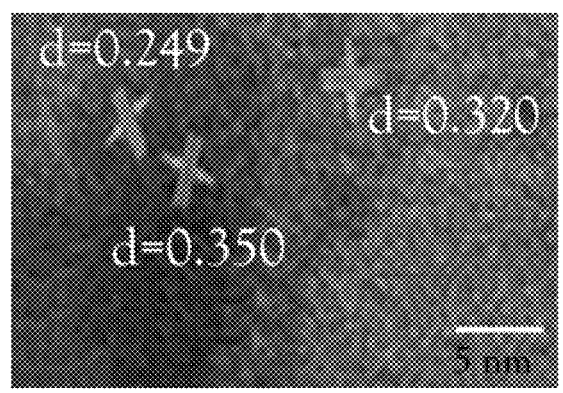
FIG. 4C shows a HRTEM image of the $T_{0.8}$ sample.
Figure 4D:
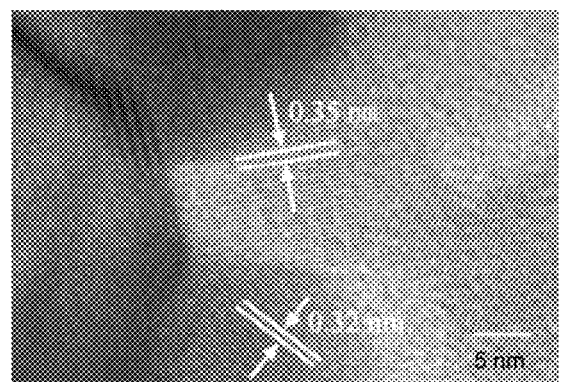
FIG. 4D shows a HRTEM image of the $T_{1.0}$ sample.

FIGS. 3A-3F show the TEM images of $T_{0.2}$, $T_{0.4}$, $T_{0.6}$, $T_{0.8}$, $T_{1.0}$, and Pt/$T_{0.8}$. $T_{0.2}$, $T_{0.4}$, $T_{0.6}$, $T_{0.8}$, and $T_{0.8}$ exhibit a spherical shape, as shown in FIGS. 3A, 3B, 3C, 3D, and 3E. Pt doping of $T_{0.8}$ led to the appearance of dots on the surface of the anatase-rutile-brookite $TiO_2$ sample, as shown in FIG. 3F. To confirm the presence of monophase, diphase, or triphase $TiO_2$, the samples $T_{0.2}$, $T_{0.6}$, $T_{0.8}$, and $T_{1.0}$ were subjected to HRTEM (FIG. 4A-4D). The lattice spacing at 0.35 nm confirmed the presence of the anatase phase in $T_{0.2}$, as shown in FIG. 4A. The lattice spacing at 0.35 and 0.249 nm confirmed the presence of the anatase and brookite phases in $T_{0.6}$, as shown in FIG. 4B. The lattice spacing at 0.350, 0.320, and 0.249 nm confirmed the presence of the anatase, rutile, and brookite phases in $T_{0.8}$, as shown in FIG. 4C. The lattice spacing at 0.32 and 0.350 nm confirmed the presence of the rutile and anatase phases in $T_{1.0}$, as shown in FIG. 4D.

Figure 5:
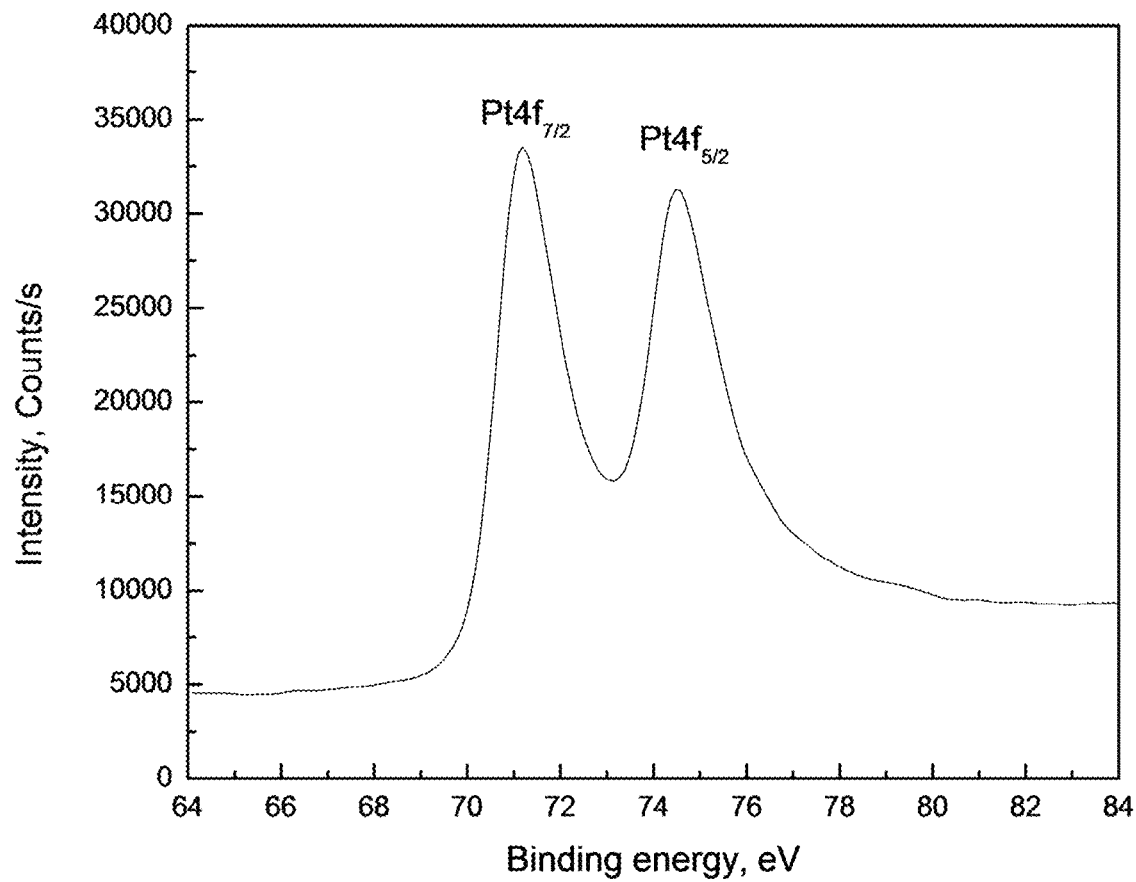
FIG. 5 shows a Pt 4f X-ray photoelectron spectroscopy (XPS) spectrum of the $Pt/T_{0.8}$ sample.

FIG. 5 shows the Pt 4f XPS spectra of the Pt/$T_{0.8}$ sample. The binding energies at 71.1 eV and 76.5 eV confirmed that the doped platinum was metallic platinum.

The Brunauer-Emmet-Teller (BET) surface areas of $T_{0.2}$, $T_{0.4}$, $T_{0.6}$, $T_{0.8}$, $T_{1.0}$, and Pt/$T_{0.8}$ are 120, 110, 100, 95, 100, and 85 m$^2$/g, respectively, as listed in Table 1. Therefore, the BET surface area decreases in the order: anatase>anatase+brookite>anatase+brookite+rutile>anatase+rutile. Notably, the BET surface area of Pt/$T_{0.8}$ was smaller than that of $T_{0.8}$, probably because some of the pores of anatase+brookite+rutile $TiO_2$ were blocked upon Pt doping.

Figure 6:
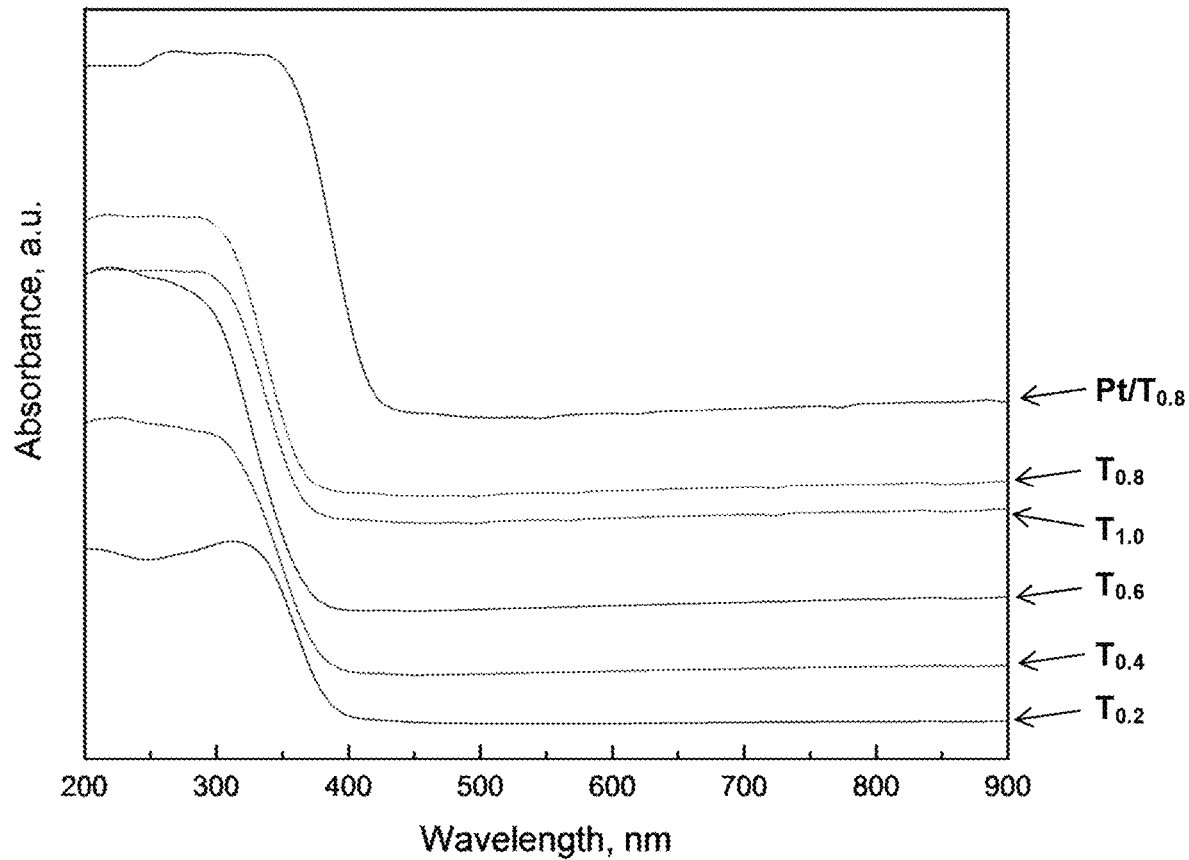
FIG. 6 shows UV-Vis spectra of the $T_{0.2}$, $T_{0.4}$, $T_{0.6}$, $T_{0.8}$, $T_{1.0}$, and $Pt/T_{0.8}$ samples.

FIG. 6 shows the UV-Vis spectra of $T_{0.2}$, $T_{0.4}$, $T_{0.6}$, $T_{0.8}$, $T_{1.0}$, and Pt/$T_{0.8}$. Increasing the amount of hexadecylamine from 0.2 to 0.8 mmol caused the absorption edge to shift to a longer wavelength because of the formation of the rutile, anatase, and brookite mixture.

However, increasing the amount of hexadecylamine above 0.8 mmol caused the absorption edge to shift to a shorter wavelength due to the formation of a mixture of the anatase and rutile phases, as confirmed by XRD, Raman, and TEM. Doping of metallic platinum on the surface of $T_{0.8}$ also caused the absorption edge to shift to a longer wavelength. The band gap energies were calculated using the UV-Vis spectra and are tabulated in Table 1. The band gap energies of $T_{0.2}$, $T_{0.4}$, $T_{0.6}$, $T_{0.8}$, $T_{1.0}$, and Pt/$T_{0.8}$ were 3.2, 2.90, 2.75, 2.64, and 2.37 eV, respectively. The lowest band gap energy was obtained with $T_{0.8}$ (2.55 eV), and this value decreased to 2.37 eV upon doping with 2 wt % platinum.

TABLE 1

BET surface areas and band gap energies of $T_{0.2}$, $T_{0.4}$, $T_{0.6}$, $T_{0.8}$, $T_{1.0}$, and Pt/$T_{0.8}$.

| Sample | $S_{BET}$ (m$^2$/g) | Band gap energy, eV |
|---|---|---|
| $T_{0.2}$ | 120 | 3.2 |
| $T_{0.4}$ | 110 | 2.90 |
| $T_{0.6}$ | 100 | 2.75 |
| $T_{0.8}$ | 95 | 2.55 |
| $T_{1.0}$ | 100 | 2.64 |
| Pt/$T_{0.8}$ | 85 | 2.37 |

Figure 7:
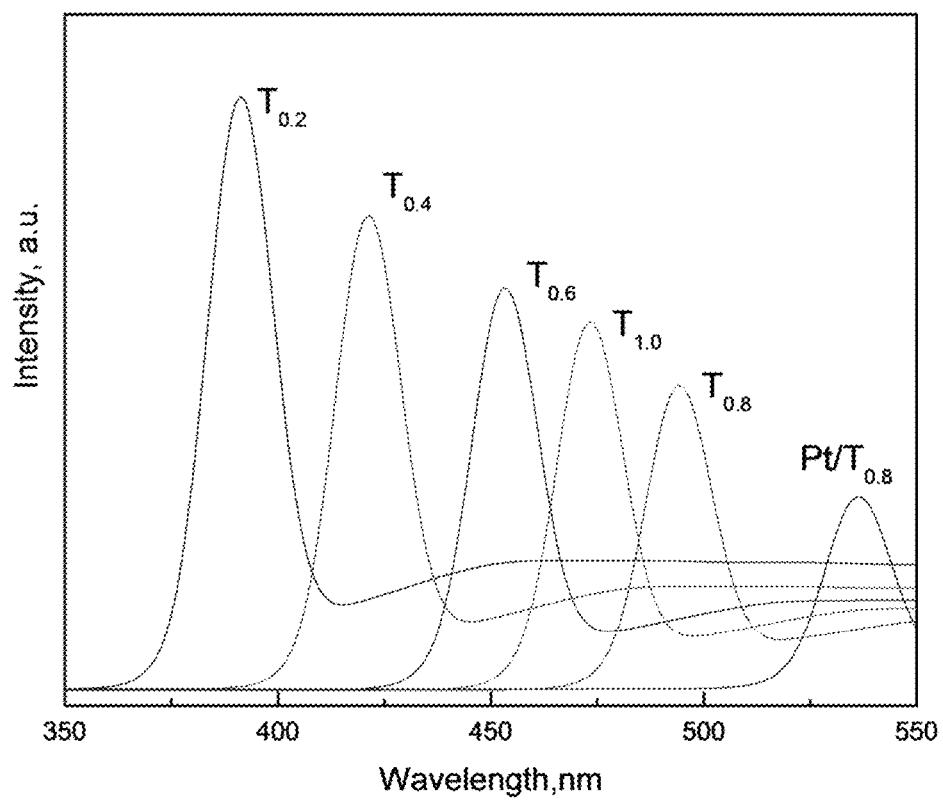
FIG. 7 shows photoluminescence (PL) spectra of the $T_{0.2}$, $T_{0.4}$, $T_{0.6}$, $T_{0.8}$, $T_{1.0}$, and $Pt/T_{0.8}$ samples.
Figure 8:
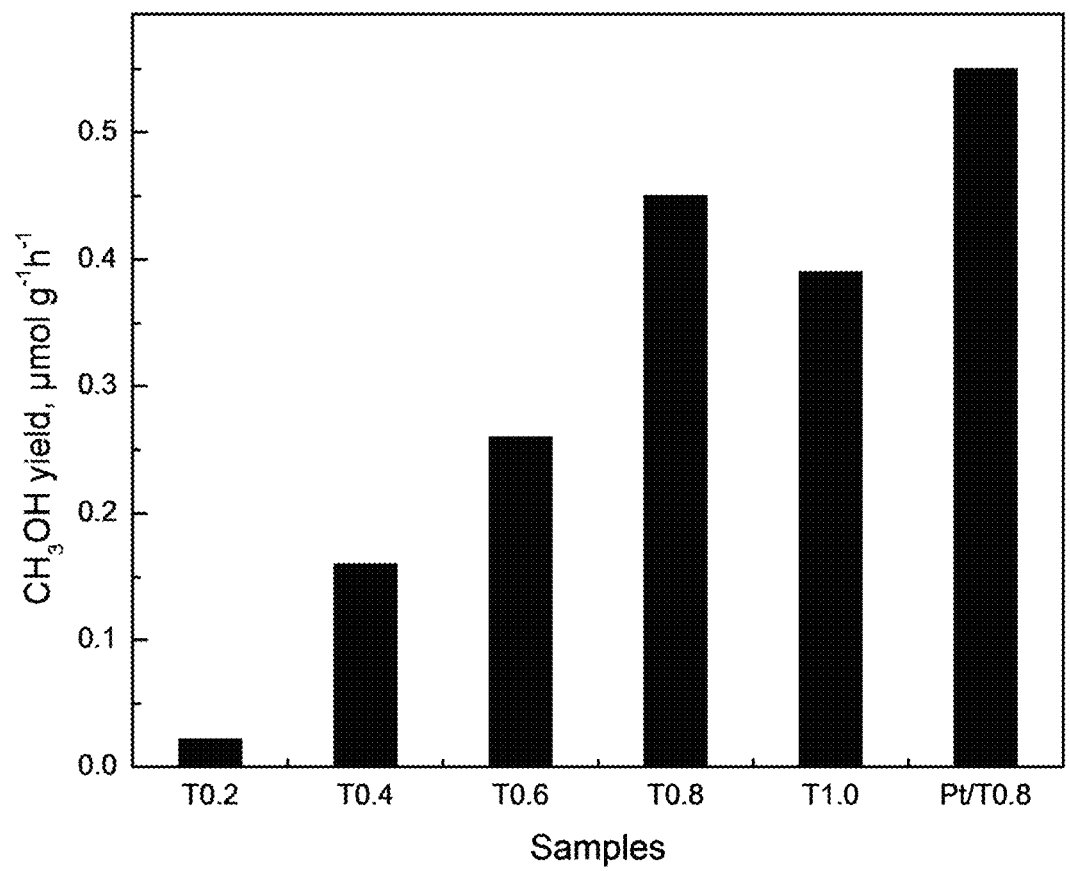
FIG. 8 shows the yields of methanol produced when using $T_{0.2}$, $T_{0.4}$, $T_{0.6}$, $T_{0.8}$, $T_{1.0}$, and $Pt/T_{0.8}$ samples as photocatalysts.

PL sheds light on the recombination rate of electron-hole pairs. FIG. 7 shows the PL spectra of $T_{0.2}$, $T_{0.4}$, $T_{0.6}$, $T_{0.8}$, $T_{1.0}$, and Pt/$T_{0.8}$. Increasing the amount of hexadecylamine from 0.2 to 0.8 mmol resulted in a decrease in the intensity of the PL peak, due to formation of a mixture of the rutile, anatase, and brookite phases, which increased the electron-hole separation. However, increasing the amount of hexadecylamine above 0.8 mmol caused the intensity of the PL peak to increase, due to the formation of a mixture of the anatase and rutile phases, which is in agreement with the XRD, Raman, and TEM results. Pt doping of $T_{0.8}$ resulted in a decrease in the PL peak intensity. The band gap energies were calculated using the PL emission spectra. The band gap energies of $T_{0.2}$, $T_{0.4}$, $T_{0.6}$, $T_{0.8}$, $T_{1.0}$, and Pt/$T_{0.8}$ were 3.1, 2.91, 2.75, 2.54, 2.63, and 2.36 eV, respectively, which were very similar to the values obtained from the UV-Vis spectra. The lowest band gap energy was obtained with $T_{0.8}$ (2.54 eV), and this value decreased to 2.36 eV upon doping with 2 wt % platinum. Photocatalytic Activities of $T_{0.2}$, $T_{0.4}$, $T_{0.6}$, $T_{0.8}$, $T_{1.0}$, and Pt/$T_{0.8}$ The effect of the hexadecylamine and the platinum doping on the photocatalytic activity of the $T_{0.2}$, $T_{0.4}$, $T_{0.6}$, $T_{0.8}$, $T_{1.0}$, and Pt/$T_{0.8}$ samples is shown in FIG. 8. $T_{0.2}$ exhibited low photocatalytic activity, and platinum doping of $T_{0.8}$ led to an increase in the photocatalytic activity. Increasing the amount of hexadecylamine from 0.2 to 0.8 mmol led to an increase in the yield of $CH_3OH$ from 0.022 to 0.450 $\mu mol \cdot g^{-1} \cdot h^{-1}$. The yield of $CH_3OH$ decreased from 0.45 to 0.39 $\mu mol \cdot g^{-1} \cdot h^{-1}$ upon increasing the amount of hexadecylamine above 0.8 mmol. Pt doping of $T_{0.8}$ led to an increase in the yield of $CH_3OH$ from 0.45 to 0.55 $\mu mol \cdot g^{-1} \cdot h^{-1}$.

Figure 9:
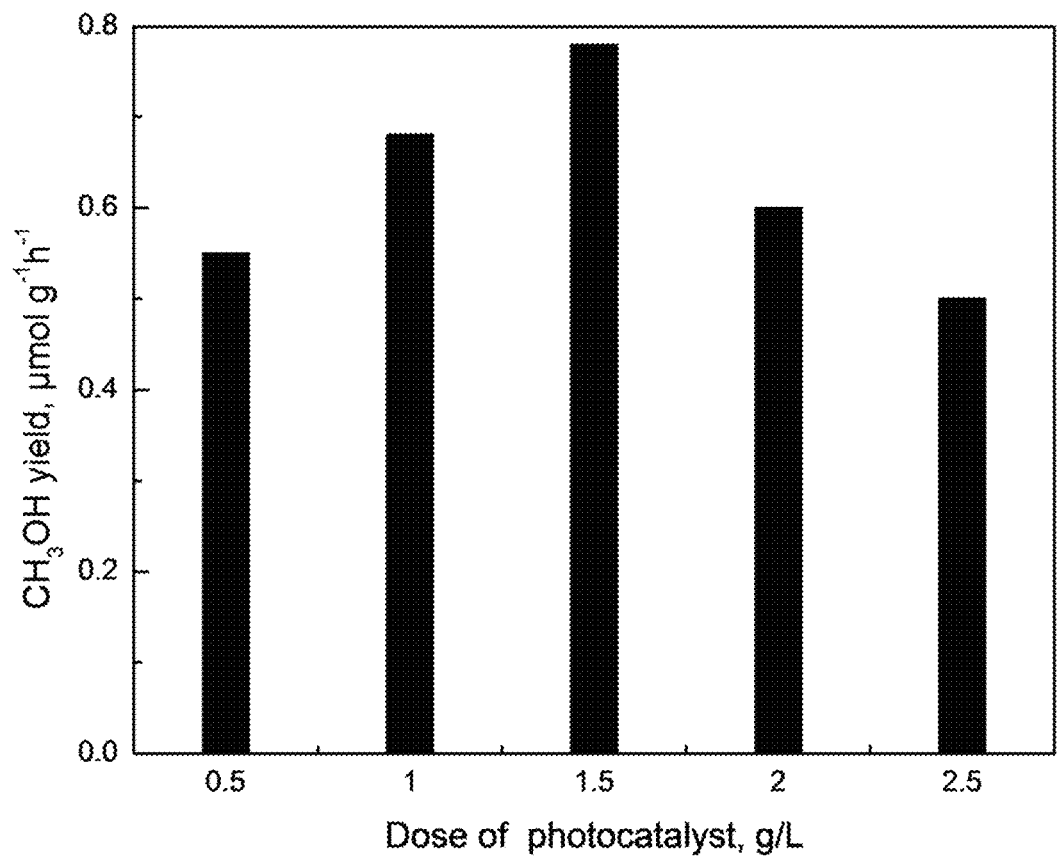
FIG. 9 shows the yields of methanol produced when using different concentrations of the $Pt/T_{0.8}$ sample as a photocatalyst.

FIG. 9 shows the effect of the amount of Pt/$T_{0.8}$ on the photocatalytic reduction of $CO_2$. Increasing the concentration of the photocatalyst from 0.5 to 1.5 g/L increased the yield of $CH_3OH$ from 0.55 to 0.78 $\mu mol \cdot g^{-1} \cdot h^{-1}$, because increased amounts of photocatalyst increase the number of active sites available for the photocatalytic reduction. However, the yield of $CH_3OH$ decreased when the concentration of the photocatalyst was greater than 1.5 g/L, likely because photocatalyst doses above 1.5 g/L hindered the penetration of light on the photocatalyst surface, thus decreasing the photocatalytic activity and $CH_3OH$ yield.

Figure 10:
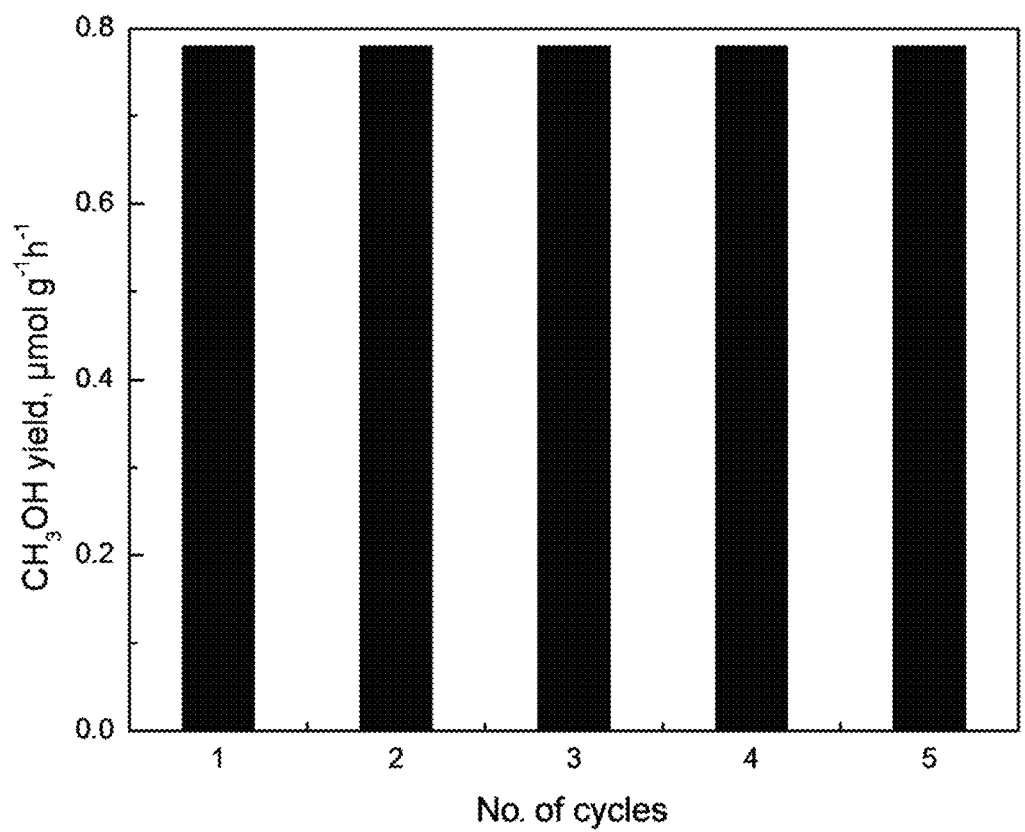
FIG. 10 shows the yield of methanol produced when reusing the $Pt/T_{0.8}$ sample as a photocatalyst.

FIG. 10 shows the reusability of the Pt/$T_{0.8}$ photocatalyst in the photocatalytic reduction of $CO_2$. The Pt/$T_{0.8}$ photocatalyst exhibited high photocatalytic stability while being reused four times.

A multiphasic titanium dioxide nanocomposite was prepared at room temperature via an ultrasonic method using hexadecylamine as a surfactant. Platinum was doped on the surface of the multiphasic titanium dioxide nanocomposite by a photo-assisted deposition method. Platinum-doped multiphasic titanium dioxide nanocomposite exhibited high photocatalytic activity under visible light, and thus may be a promising photocatalyst. Platinum-doped multiphasic titanium dioxide nanocomposite also exhibited photocatalytic stability in the reduction of carbon dioxide.

The invention claimed is:

1. A method for producing a multiphasic titanium dioxide photocatalyst comprising anatase, brookite, and rutile phases, the method comprising:
   mixing titanium isopropoxide, an alcohol, water, an inorganic acid, and a surfactant to form a mixture;
   sonicating the mixture to produce a sonicated mixture;
   drying the sonicated mixture to form a powder; and
   heating the powder at 400° C. or greater to form the multiphasic titanium dioxide photocatalyst.

2. The method of claim 1 wherein the mixture comprises titanium isopropoxide at a concentration of 0.5-2 M.

3. The method of claim 1 wherein the mixture comprises the alcohol at a concentration of 1-5 M.

4. The method of claim 1 wherein the mixture comprises the inorganic acid at a concentration of 0.05-1 mM.

5. The method of claim 1 wherein the mixture comprises the surfactant at a concentration of 3.5-5.2 mM.

6. The method of claim 1 wherein the surfactant is an alkylamine comprising 6-20 carbon atoms per molecule.

7. The method of claim 6 wherein the surfactant is hexadecylamine.

8. The method of claim 1 wherein the multiphasic titanium dioxide photocatalyst has a band gap energy of 2.46-2.70 eV and a surface area of 91-105 m$^2$/g.

9. The method of claim 1 further comprising:
   mixing the multiphasic titanium dioxide photocatalyst with a platinum precursor and the alcohol to form a second mixture;
   irradiating the second mixture with an ultraviolet radiation to produce an irradiated mixture; and
   drying the irradiated mixture to form a platinum-doped multiphasic titanium dioxide photocatalyst.

10. The method of claim 9 wherein the second mixture comprises the platinum precursor at a concentration of 0.5-5 mM and the multiphasic titanium dioxide photocatalyst at a concentration of 5-50 g/L.

11. The method of claim 9 wherein the platinum-doped multiphasic titanium dioxide photocatalyst comprises anatase, brookite, and rutile phases, and has a band gap energy of 2.10-2.45 eV and a surface area of 70-90 m$^2$/g.

12. The method of claim 9 wherein the platinum-doped multiphasic titanium dioxide photocatalyst comprises 0.5-3 wt % platinum.

13. A method of reducing carbon dioxide into methanol comprising:
   mixing a multiphasic titanium dioxide photocatalyst with a carbonate solution to form a dispersed photocatalyst mixture, wherein the multiphasic titanium dioxide photocatalyst comprises anatase, rutile, and brookite phases, and has a band gap energy of 2.10-2.70 eV and a surface area of 70-105 m$^2$/g; and
   irradiating the dispersed photocatalyst mixture with light to produce methanol.

14. The method of claim 13 wherein the multiphasic titanium dioxide photocatalyst is doped with 0.5-3 wt % Pt.

15. The method of claim 13 wherein the dispersed photocatalyst mixture comprises carbonate and/or bicarbonate at a total concentration of 30-150 mM.

16. The method of claim 13 wherein the light has a wavelength of 400-700 nm.

17. The method of claim 13 wherein the dispersed photocatalyst mixture comprises the multiphasic titanium dioxide photocatalyst at a concentration of 0.2-5 g/L.

18. The method of claim 13 wherein the methanol is produced at a rate of 0.20-1.00 µmol/h per gram of the multiphasic titanium dioxide photocatalyst.

19. The method of claim 13 further comprising:
recovering the multiphasic titanium dioxide photocatalyst after the irradiating to obtain a recovered multiphasic titanium dioxide photocatalyst; and
reusing the recovered multiphasic titanium dioxide photocatalyst, which maintains photocatalytic activity for at least 4 reaction cycles.

* * * * *